United States Patent

[11] 3,632,327

[72] Inventors: Tamuro Matoba
 Tokyo;
 Toshio Nakayama, Otsu, Shiga, both of Japan
[21] Appl. No.: 821,893
[22] Filed: May 5, 1969
[45] Patented: Jan. 4, 1972
[73] Assignee: Nippon Electric Company, Limited
 Tokyo, Japan
[32] Priority: May 7, 1968
[33] Japan
[31] 43/31414

[54] MACHINE FOR PLANTING A REFRACTORY PIECE IN A SHEETLIKE THERMOPLASTIC MASS
 3 Claims, 7 Drawing Figs.
[52] U.S. Cl........................................... 65/154, 65/139, 65/155
[51] Int. Cl........................................... C03b 23/26
[50] Field of Search............................ 65/139, 154, 155

[56] References Cited
FOREIGN PATENTS

| | | | |
|---|---|---|---|
| 773,226 | 4/1957 | Great Britain | 65/154 |
| 777,140 | 6/1957 | Great Britain | 65/40 |

Primary Examiner—Arthur D. Kellogg
Attorney—Ostrolenk, Faber, Gerb & Soffen

ABSTRACT: On planting a refractory piece in a sheetlike mass of a thermoplastic material permeable to infrared rays, concentrated infrared rays are directed to the piece through the mass along the path of drive of the piece to heat the piece to a temperature at which the piece can be pushed into the mass. When applied to planting of the shadow-mask holding pins in the flange glass wall of a color-television picture tube face plate, the machine makes it possible to accomplish reliable and easy planting of the pins.

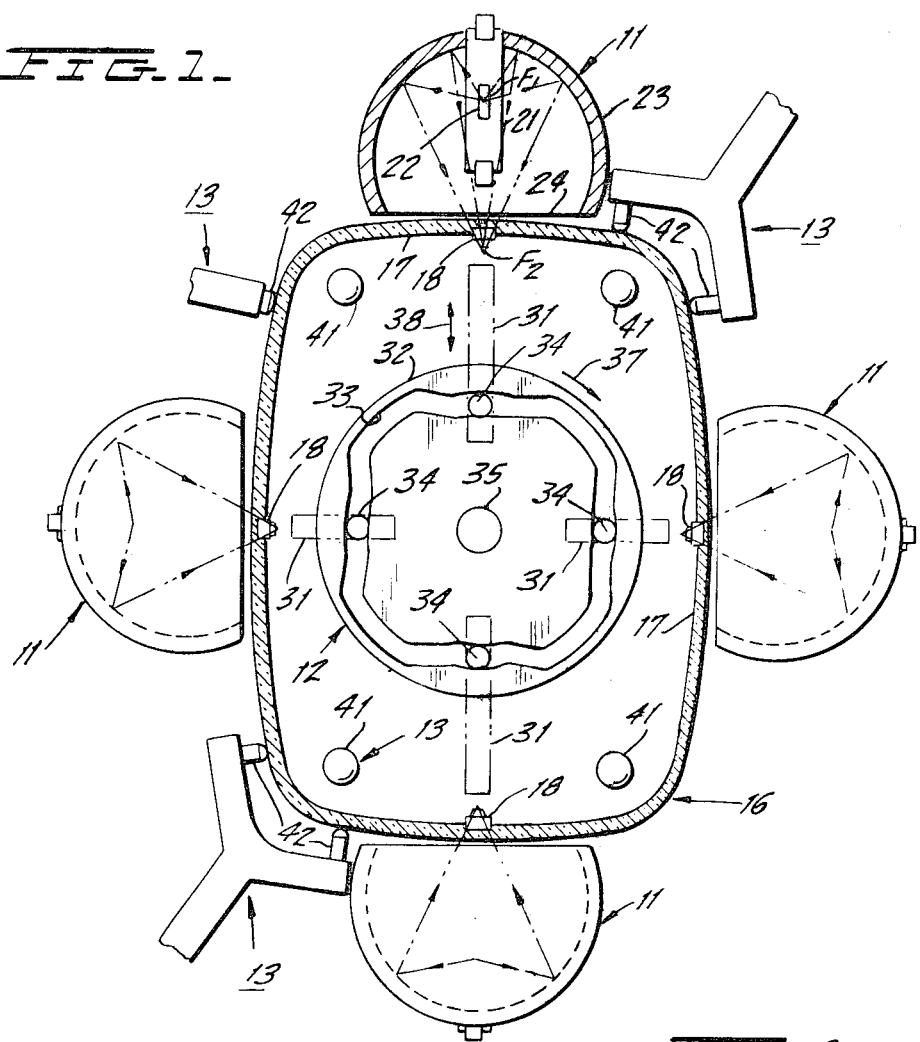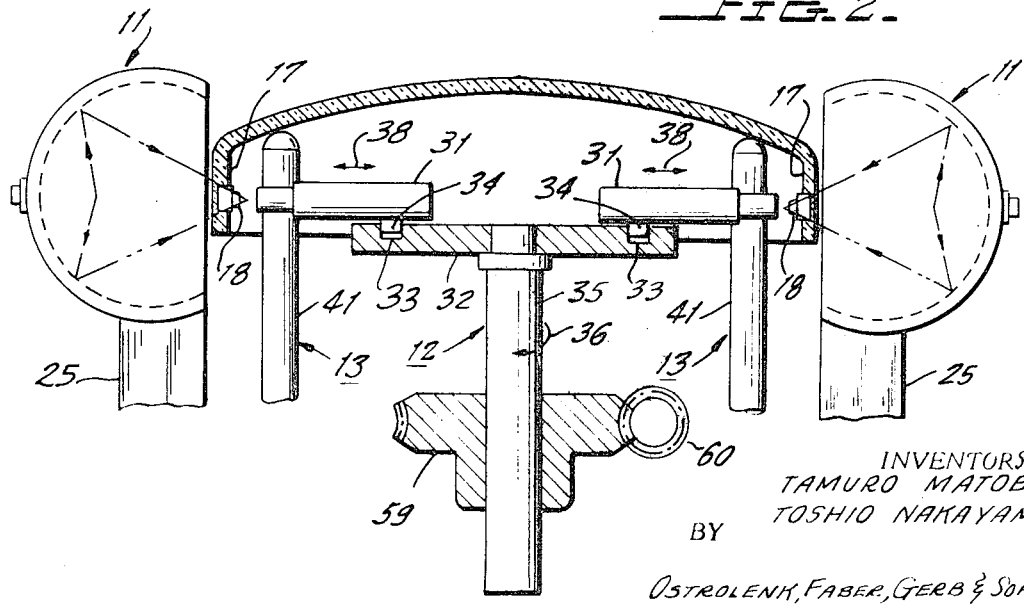

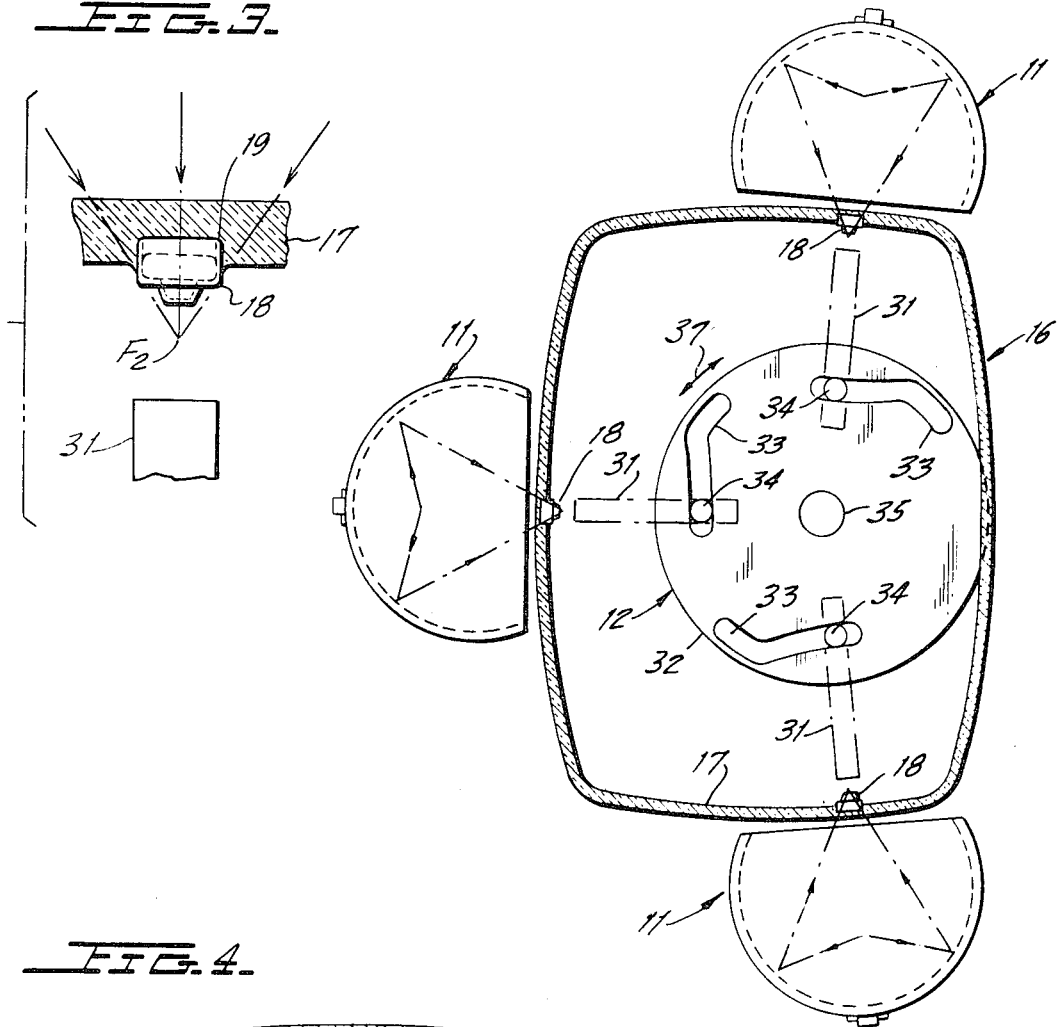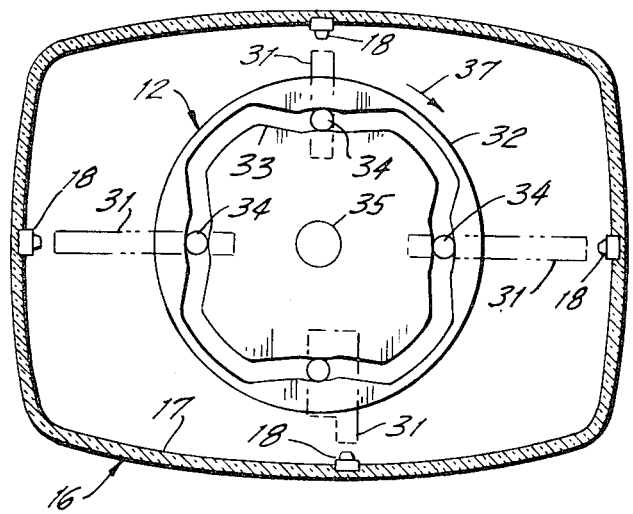

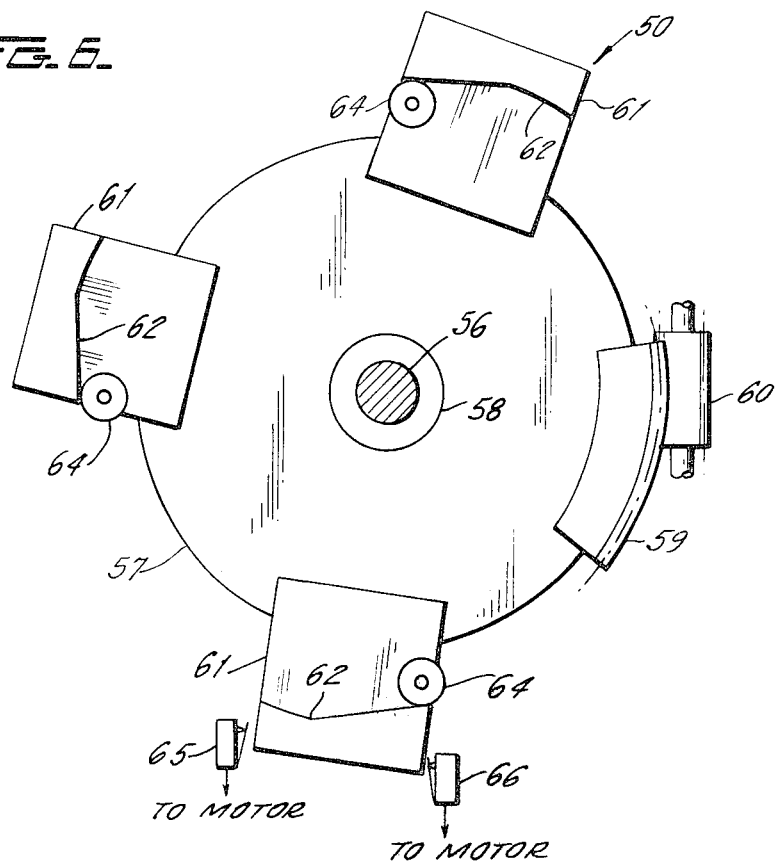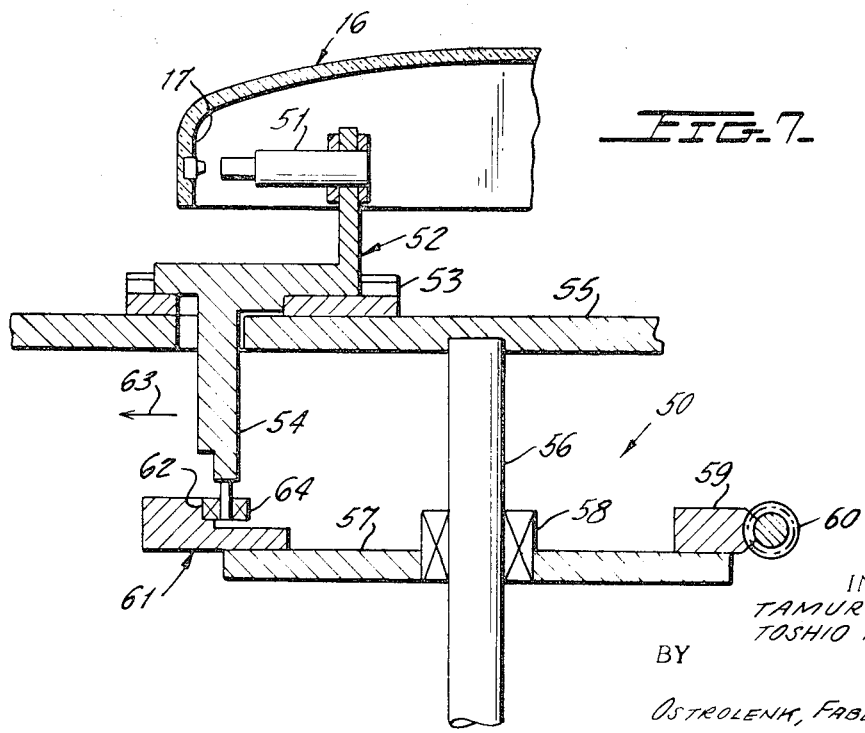

MACHINE FOR PLANTING A REFRACTORY PIECE IN A SHEETLIKE THERMOPLASTIC MASS

This invention relates to a machine for planting a small refractory piece in a sheetlike mass of a thermoplastic material, such as glass, which is permeable to infrared rays. In particular, although not exclusively, the invention relates to a machine for planting the shadow-mask holding metallic pins or studs in the inside surface portion of the flange glass wall of a face plate of a color-television picture tube in a predetermined manner.

Conventional machines for planting the shadow-mask holding pins in a face-plate flange glass wall normally comprise means for heating the pins to be planted and means for driving the heated pins into the glass wall. The heating means comprises either gas burners or high-frequency induction heating coils. The heating and the driving means are placed within the glass-limited space surrounded by the face-plate flange, congesting the restricted space. Therefore, such machines are not only complicated in construction and inconvenient to operate, but also the inconvenient manageability of the machine often results in damage to the face plate under work. These defects in conventional machines are further amplified by reductions in the dimensions of the face plate. Furthermore, the heating means of conventional machines heats only the peripheral surface portions of the respective pins and only while the pins are driven towards the face-plate flange glass wall and does not directly heat those end portions of such pins at which the driven pins are eventually brought into contact with the interior surface of the glass wall to be pushed thereinto. In this regard, it should be noted that the end portion of a pin of the kind described above is cup-shaped or has an indent surrounded by a protruded peripheral rim which remains in the glass wall after completion of the planting operation. Still further, when driven near to the glass wall, the pins can no longer be heated by the conventional heating means due to the nature of the heating technique and the construction of such heating means. As a result, the temperature of the portions of the pins drops appreciably when the tips of such rims are brought into physical contact with the glass wall. This fact gives rise to unreliable and awkward planting of the pins. Alternatively, this necessitates heating of the pins during the drive to an excessively higher temperature than is required for the pins to soften the surface portion of the glass wall receiving the pins. This fact imposes an extra burden on the heating means and contaminates the pins resulting again in unreliable planting of the pins. Similar defects exist in a more general machine for planting a refractory piece in a sheetlike mass of a thermoplastic material.

It is therefore an object of this invention to provide a machine for planting a refractory piece in a sheetlike mass of a thermoplastic material permeable to infrared rays, wherein the refractory piece is subjected to infrared rays heating.

Another object is to provide a machine of the type described which is simple in construction.

Still another object is to provide a machine of the type described which is characterized by its reliable performance.

Yet another object is to provide a machine of the type described which is characterized by its ease of operation.

A further object is to provide a machine of the type described wherein heat is projected onto that portion of the piece to be planted which is most significant to achieve the desired results.

A still further object is to provide a machine of the type described which is characterized by yielding resulting products of excellent appearance.

A specific object is to provide a machine for planting metallic pins for holding a shadow mask into the flange glass wall of a face plate of a color-television picture tube, whereby any one of the objects mentioned above is attained.

Another specific object is to provide a machine of the last-mentioned kind wherein the space surrounded by the flange is not congested by the heating, holding and planting structure.

According to this invention, a machine for planting a refractory piece in a sheetlike thermoplastic mass permeable to infrared rays comprises a heating device for heating the piece to a temperature at which a portion of the piece can be pushed into the mass, a driving device for driving the heated piece along a prescribed path and eventually into the mass, and a holding device for holding the mass between the heating and the driving means. The heating device, in turn, comprises a source of infrared radiation and a truncated substantially spheroidal reflector having an opening at the truncated end and one of the foci being substantially coincident with the position of the source and the other of the foci being located at a preselected distance outside the truncated end. The optical axis of the reflector is made to substantially coincide with the path, so that the piece under drive by the driving device may be heated to the above-mentioned temperature. When applied to a machine for planting the shadow-mask holding metallic pins in the flange of a face plate, it is necessary to provide a plurality of such heating devices, at least equal in number to the pins to be planted in the flange of one face plate, in the unrestricted open space outside the flange, with the driving device being placed within the glass-limited space surrounded by the flange.

Inasmuch as the heating and the driving devices do not coexist on one side of the mass, a machine of this invention is greatly simplified in construction. Inasmuch as the piece is driven toward the heating device according to the invention, it is possible to continue heating of the piece even while the piece is being pushed into the mass and consequently to achieve reliable performance. Furthermore, these advantages of the machine of the invention warrants easy operation of the machine. Driving of the piece towards the heating device makes it possible to effectively heat that end of the piece which is brought into contact with the surface of the mass. Thus, a machine of the invention supplies products of excellent appearance. In a machine for planting the shadow-mask holding pins, disposition of the heating devices outside the face-plate flange gives astonishingly remarkable advantages in that the restricted glass-limited space surrounded by the flange is not congested and in that those ends of the respective pins which eventually reach the glass wall to soften the glass are subjected to concentrated heating throughout the drive along the respective paths until planting itself is completed.

This invention will now be described with reference to the accompanying drawings, wherein:

FIG. 1 shows a fragmentary schematic plan of an embodiment of this invention, with parts cut away to simplify the understanding of the device;

FIG. 2 is a similarly sectionalized side view of the embodiment of FIG. 1;

FIG. 3 shows a portion of the embodiment of FIG. 1 on an enlarged scale;

FIG. 4 shows a fragmentary schematic plan of a modification of the embodiment of FIG. 1, with parts cut away to facilitate understanding of the invention;

FIG. 5 is a similar plan view of another modification;

FIG. 6 is a similar plan of a modified driving device; and

FIG. 7 is a similar side view of the modification of FIG. 7.

Referring to FIGS. 1-5 inclusive, a machine of this invention for planting the shadow-mask holding pins in the face-plate flange comprises a plurality of heating devices 11, a driving device 12, and a face-plate holding device 13. The heating devices 11 are generally four in number and are arranged on a horizontal plane. The holding device 13 is adapted to removably receive a face plate 16 having a flange 17, in whose inside surface portion a plurality of shadow-mask holding metallic pins 18 are to be planted by the machine, with the viewing area of the face plate 16 held horizontally. Each pin 18 has a cup-shaped end or has an indent or cavity surrounded by a protruded peripheral rim 19 as best depicted in FIG. 3. The heating devices 11 heat the pins 18 during the radially outward drive by the driving device 12 to a temperature at which the tim 19 can be pushed into the inside surface portion of the flange 17 by the continued drive of the driving device 12. In this connection, it should be mentioned that the pins 18 are preliminarily oxidized in the known manner to facilitate intimate attachment to the glass. This is particularly advantageous for the invention, because the oxidized pins 18 look generally black so as to be more efficiently heated by infrared rays.

Each heating device 11 comprises a source of infrared radiation 21 which, when energized by a power supply (not shown), emits infrared rays for heating the pins 18. The source 21 is preferably a fused-quartz halogen lamp having a tungsten filament 22, although any other suitable radiation source may be employed. The heating device 11 further comprises a substantially spheroidal-shaped reflector 23 for the infrared rays in which the source 21 is held by a conventional lamp-socket or the like means (not shown). The reflector 23 has a truncated end 24 which forms an opening through which the reflected infrared rays are emitted. The reflector 23 is positioned so that one of the foci ($F_1$) lies substantially at position of the filament 22 and the other one of the foci ($F_2$) lies a preselected distance outside the truncated end 24, so as to substantially concentrate the infrared rays at point $F_2$.

Preferably, the just-mentioned distance is equal to or somewhat less than the thickness of the glass wall of the faceplate flange 17 plus one-half the distance of travel of the pin 18 being driven by the driving device 12 or at a point somewhat nearer to the flange 17. Most preferably, the preselected length is such that the pin 18 heated by the concerned heating device 11 and driven towards the flange 17 may pass through the point $F_2$ of heat concentration just before the tip of the rim 19 reaches the inside surface of the flange 17. The heating devices 11 are supported by a supporting device 25, to be more fully described. The supporting devices are designed such that the radial and the azimuthal positions of the heating devices 11 may be adjustable.

The driving device 12 comprises a plurality of horizontally and radially disposed pin driving rods 31, preferably equal in number to the heating devices 11, for removably holding a set of the respective pins 18 to be planted in one face plate by means of a conventional chuck or similar means (not shown) provided at the positive outermost ends of the substantially radially aligned rods. The rods 31 are supported by the body of the driving device 12 through conventional guide means (not shown) so as to be confined to experience reciprocal movement substantially along their respective longitudinal axes. Each pin 18 is held by an associated rod at an end remote from the rim 19. The driving device 12 further comprises a cam disc 32 for carrying the rods 31 by cooperation of a cam groove 33 formed in the disc 32 and cam follower bosses 34 fixed to their respective rods 31. The device 12 is still further comprised of a cam-disc driving shaft 35 fixed to the cam disc 32 for causing, when driven by a motor (not shown) in the direction shown by arrow 36, rotation of the disc 32 is illustrated by another arrow 37, although the senses of rotation of the shaft 35 and consequently the disc 32 are not material if the form of the groove 33 is symmetric. The arrangement is such that, as the cam disc 32 rotates from the azimuthal position depicted in FIG. 1, the rods 31 are simultaneously and uniformly driven substantially radially outwards along their respective prescribed paths, and then return back to their respective rest or starting positions illustrated. This reciprocating movement of the rods 31 is symbolized by arrows 38. The distance of travel of each pin 18 caused by the concerned rod 31 is of the order of 10–20 mm., however, the distance travelled may be greater, or smaller if desired.

The heating devices 11 are disposed to surround the flange 17 and each device confronts an associated driving rod 31. More particularly, the optical axis of the spheroidal reflectors 23 are arranged to substantially coincide with the respective prescribed paths of the rods 31 mentioned above. In this connection, it is to be noted that these paths need not necessarily be rectilinear, need not pass through the axis of rotation of the cam disc 32 as will be seen from FIG. 4, nor need they be perpendicular to the surface of the flange 17. At any rate, the concentrated infrared rays are projected not only onto the peripheral surface of the pin 18 but also onto the inside surface of the rim 19. The holding device 13 removably holds one face plate 16 at a time in such a manner that the flange 17 may intervene between the heating devices 11 and the pin driving rods 31, with the heating devices 11 and the driving device 12 disposed outside and within the glass-limited space of that face plate 16 which is held by the holding device 13, respectively. Incidentally, the number of the heating devices 11 and consequently the pin driving rods 31 may each be three in number in cases where the machine is exclusively used to plant three pins 18 in a face-plate flange 17 as shown in FIG. 5, although use may be made of a machine with four each of such devices 11 and rods 31 even in such a case. The holding device 13 comprises a plurality of vertically extending supports 41 for supporting at their top ends the inside surface of the viewing area of a face plate 16. The device 13 further comprises a plurality of horizontal supports 42 for inwardly pushing the outside surface of the flange 17. The device 13 is so designed because it is necessary to exactly position the face plate 16 so that the pins 18 may be planted in the respective precise positions.

In operation, the cam disc 32 is first put into that azimuthal position where the pin driving rods 31 are brought into the respective rest or innermost starting positions. With the rods 31 held in these positions, four or any required number of the shadow-mask holding pins 18 are attached to the holding chucks (not shown) of their associated rods 31. A face plate 16 is then placed upon the holding device 13. The heating devices are then energized and the rods 31 are set into substantially radial outward movement. The pins 18 are heated to the above-mentioned temperature by the time they reach the inside surface of the flange 17. The rims 19 of the respective pins 18, being driven still further by their respective rods 31, are pushed into the inside surface portion of the flange 17. The heating devices 11 are now deenergized and the pins 18 are released from the holding force imposed by the respective rods 31 so as to remain planted in the flange 17. Continued rotation of the cam disc 32 retracts the rods 31 to their respective starting positions, leaving the pins 18 planted in the flange 17. The finished face plate 16 is now removed from the holding device 13 and put aside. Repetition of the above cycle of operation makes it possible to consecutively plant the pins 18 in the flanges 17 of the successively charged face plates 16 by fours or by any required number at one time. By way of example, it is possible with a machine having 1 kw. iodine lamps 21 to heat the pins 18 of a heat-resisting iron alloy (18-chromium stainless steel containing titanium of 0.1–0.5 percent) up to 1,200° C. within 15 to 20 seconds. It will now occur to those skilled in the art to adapt the pin driving rods 31 to automatic supply of the shadow-mask holding pins 18 carried out while the rods 31 are in the respective substantially still backwardmost positions and even to modify the machine to provide a fully automatic operation.

Referring to FIGS. 6 and 7, another driving device 50 comprises a plurality of pin driving rods 51 similar to those described with reference to FIGS. 1–5, inclusive. Each rod 51 is vertically adjustably held by the arm of a rod holder 52 which, in turn, is horizontally and substantially radially slidable along a holder guide 53 and has a downwardly extended leg 54. The guides 53 are attached to a fixed table 55, having a downwardly directed post 56 fixedly secured to the center of the table. The post 56 rotatably supports a rocking disc 57 by a bearing 58. A worm gear 59 is fixedly secured to disc 57 for engaging a worm 60 rotatable by a motor (not shown). See also FIG. 1 which may likewise employ a worm gear 59 and worm 60 to rotate shaft 35. The disc 57 carries cam pieces 61 mounted adjacent the bottom ends of the respective legs 54. Each cam piece 61 has a cam surface 62. Each leg 54 is urged substantially radially outward by spring means or otherwise (not shown) symbolized by an arrow 63. A cam follower roller 64 rotatably held by each leg 54 at the bottom end is thus urged against the cam surface 62 of an associated cam piece 61.

As the worm 60 is put into rotation, the disc 57 rocks about the longitudinal axis line of the post 56. Therefore, the cam pieces 61 are eventually moved to let the holders 52 slide radially along the respective guides 53. As soon as the pins 18 are planted by the radially outward movement of the pin driving rods 51 caused by rotation of the worm 60 in one sense, a switch automatically operates to reverse the sense of rotation of the worm 60 and to let the rods 51 return to the respective rest or starting positions, leaving the pins 18 planted in the flange 17 of a face plate 16. Circuit switches, such as 65 and 66, may be placed on opposite sides of one cam piece for reversing the motor (not shown) when struck by the cam piece.

While the invention has so far been explained mainly in conjunction with a machine for planting the shadow-mask holding pins 18 in the flange glass wall 17 of a face plate 16, it should clearly be understood that various modifications are possible within the scope of the invention set forth in the appended claims.

What is claimed is:

1. A machine for planting a refractory piece in a sheetlike mass of a thermoplastic material having means for heating said piece to a temperature at which a portion of the heated piece can be pushed into said sheetlike mass and means for driving said heated piece along a prescribed path and eventually into said sheetlike mass to be retained at a predetermined position, said sheetlike mass being permeable to infrared rays and said refractory piece being adapted to absorb infrared rays, wherein the improvement comprises a heating device serving as said heating means positioned on one side of said sheetlike mass, said heating device, in turn, comprising an infrared radiation source and a reflector having an opening for emission of infrared rays; one of the foci being substantially positioned coincident with said source and the other of said foci lying at a preselected distance outside of said opening and on the opposite side of said sheetlike mass, the optical axis of said reflector being made substantially coincident with said path, said reflector substantially concentrating the infrared rays onto the piece under drive by said driving means along said optical axis to heat the same to said temperature as said piece moves toward said sheetlike mass, the improvement further comprising means for holding said sheetlike mass between said heating device and said driving means.

2. A machine for planting metallic pins in the surface portion of the flange glass wall of a television picture tube having means for heating said pins to a temperature at which the heated pins can be pushed into said surface portion before reaching said surface portion and means for driving said heated pins along a linear path and into said surface portion at the respective predetermined positions, wherein the improvement comprises a driving device serving as said driving means for driving all the metallic pins to be planted in the inside surface portion of the flange glass wall of one face plate simultaneously and substantially radially along prescribed paths, respectively, and a plurality of heating devices positioned along the outside surface of said tube, said devices being at least equal in number to the last-mentioned metallic pins to be planted and serving as said heating means, each said heating device, in turn, comprising an infrared radiation source and a reflector having an opening for the emission of the infrared rays; said reflector being designed to concentrate radiation at one of the foci located a preselected distance outside of said opening and lying at a point inside the interior surface of the tube when said source is located at the other of said foci, the optical axis of said reflectors being made to coincide with the respective ones of said paths, said reflectors substantially concentrating the infrared rays onto the last-mentioned metallic pins to heat such pins to said temperature, said driving device driving the heated pins along said optical axis and into said surface portion simultaneously for one face plate, the improvement further comprising means for holding the face plate in such a position that said glass wall is interposed between said heating and said driving devices wherein all of said heating devices are positioned on one side of said glass wall and all of said driving devices are positioned on the opposite side of said glass wall.

3. A machine as claimed in claim 2 wherein said driving device comprises pin driving rods at least equal in number to the metallic pins to be planted in one surface portion of the flange glass wall of one face plate, each of said rods being adapted to releaseably hold an associated one of the last-mentioned metallic pins, said rods each being disposed along a respective one of said paths, and movable along such path, said driving device further comprising means for reciprocating said rods along such paths substantially in unison.

* * * * *